United States Patent [19]

Gobin

[11] 4,031,694
[45] June 28, 1977

[54] MOWER ASSEMBLY WITH CATCHER SECUREMENT

[75] Inventor: Donald L. Gobin, Savannah, Ga.

[73] Assignee: Roper Corporation, Kankakee, Ill.

[22] Filed: May 17, 1976

[21] Appl. No.: 686,888

[52] U.S. Cl. ............................... 56/202; 56/320.2
[51] Int. Cl.$^2$ .................................... A01D 35/22
[58] Field of Search ............... 56/202, 320.2, 17.4, 56/2 SS

[56] References Cited

UNITED STATES PATENTS

| 3,805,499 | 4/1974 | Woelffer et al. | 56/202 |
| 3,893,284 | 7/1975 | Thor et al. | 56/202 |

Primary Examiner—J. N. Eskovitz
Attorney, Agent, or Firm—Leydig, Voit, Osann, Mayer & Holt, Ltd.

[57] ABSTRACT

A rotary mower having a discharge chute with a downwardly angled guard for interception of missiles, the structure providing a coupling mechanism for securing a catcher to the chute, with attachment of the catcher serving to tilt the guard upwardly and to lock it in a horizontal position in which the clippings are freely discharged into the catcher. More particularly, the guard has inwardly extending projections formed with upwardly facing notches, and the chute has a cooperating outwardly facing groove. The catcher frame includes a horizontal supporting rod which is pressed against the projections incident to installing the catcher to swing the guard upwardly until the rod drops into seated position in the groove, the vertical edges of the notches serving to hold the rod captive. The rod is guided into seated position by an upstanding guide surface. An arm secured to the guard and extending inwardly into a manually accessible position is pressed to move the guard beyond its horizontal position, thereby moving the notches out of register with the groove to free the rod for removal of the catcher from the mower housing, with the guard being restored automatically to its downwardly angled position. The arm may also be manipulated, if desired, to facilitate attachment of the catcher.

11 Claims, 14 Drawing Figures

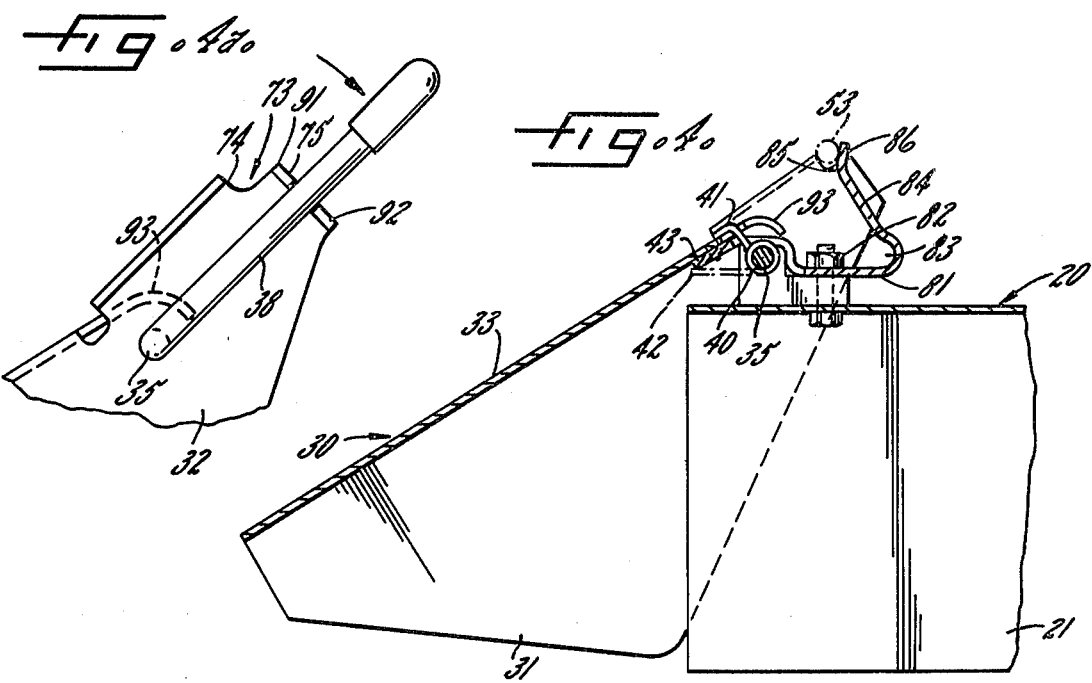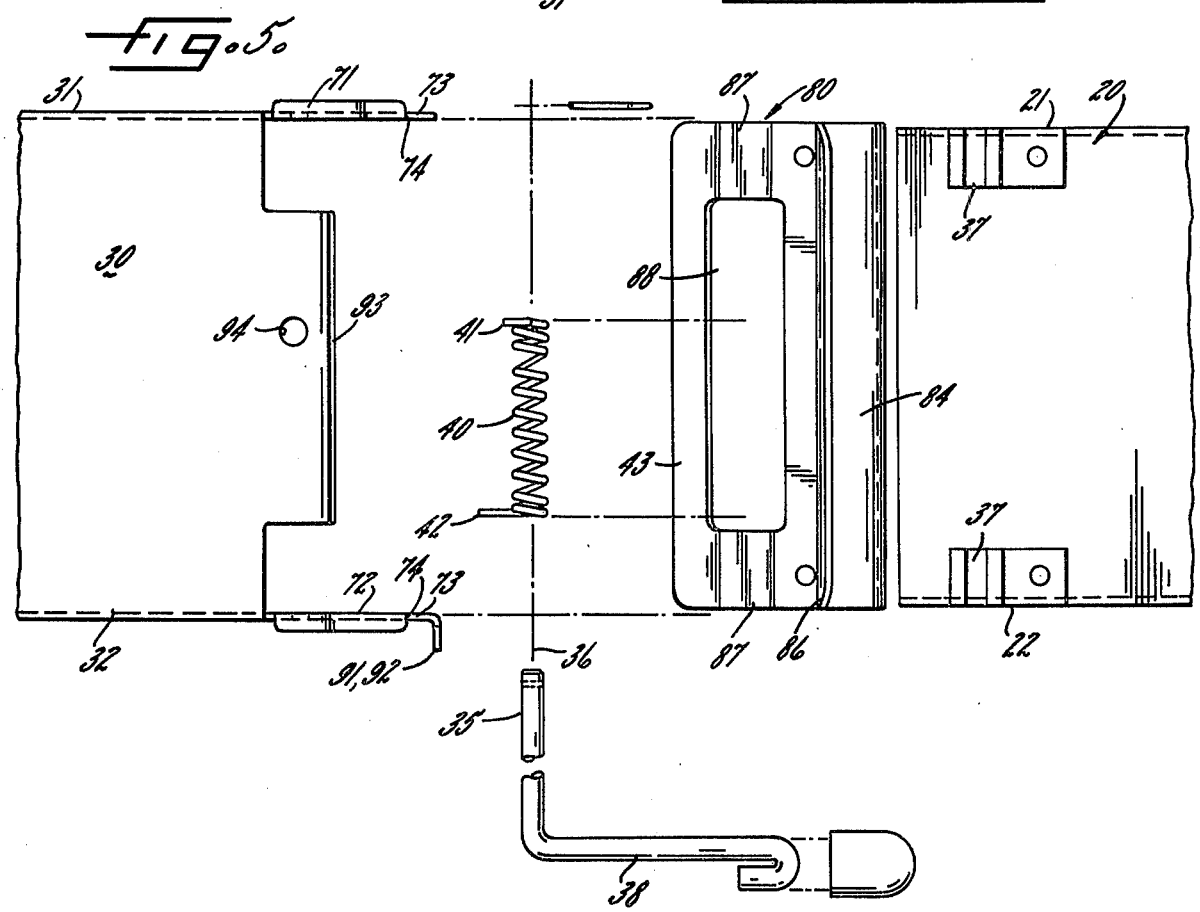

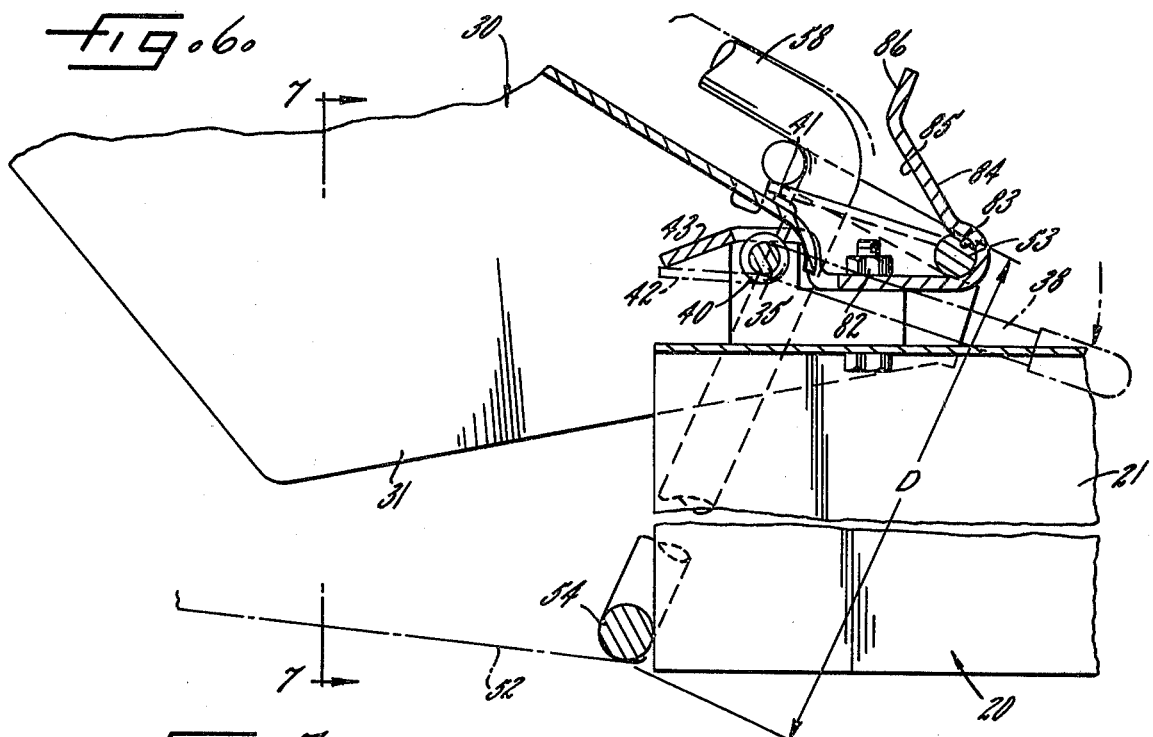
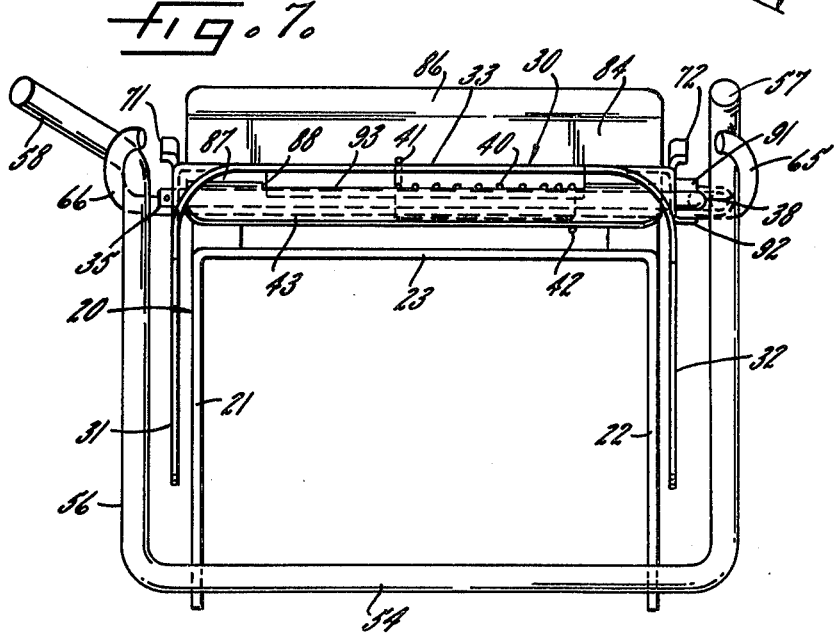
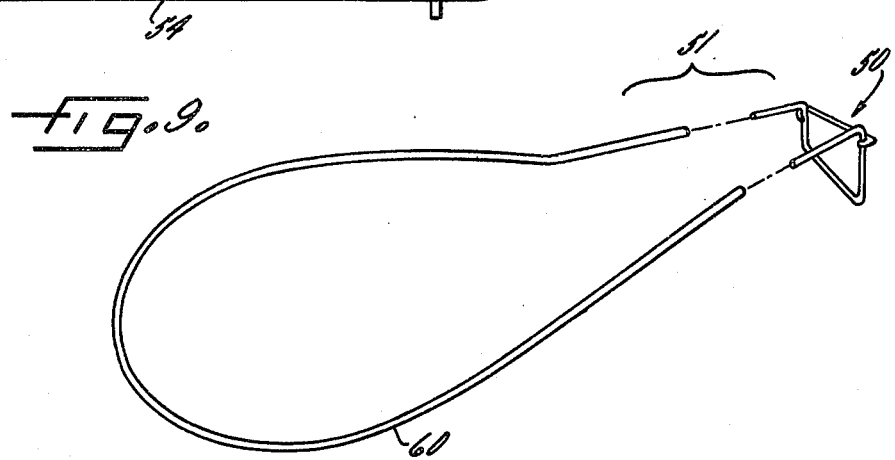

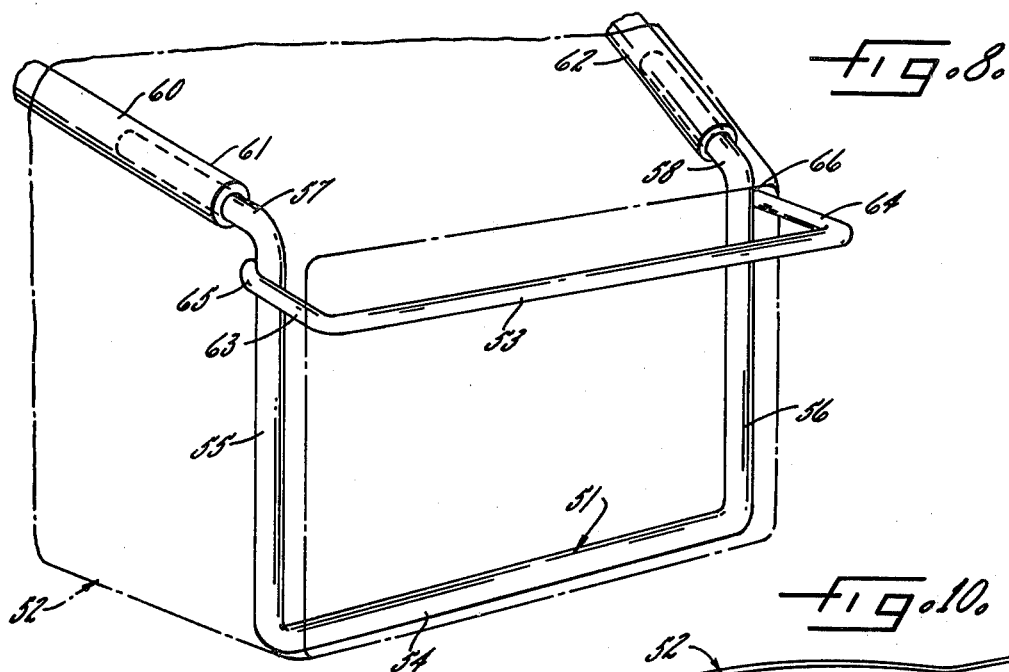
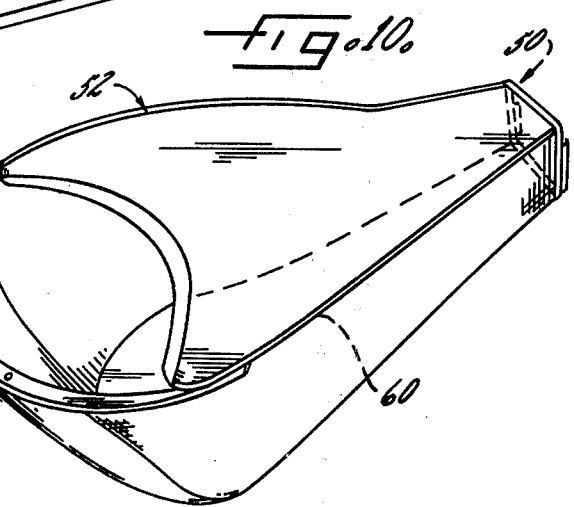
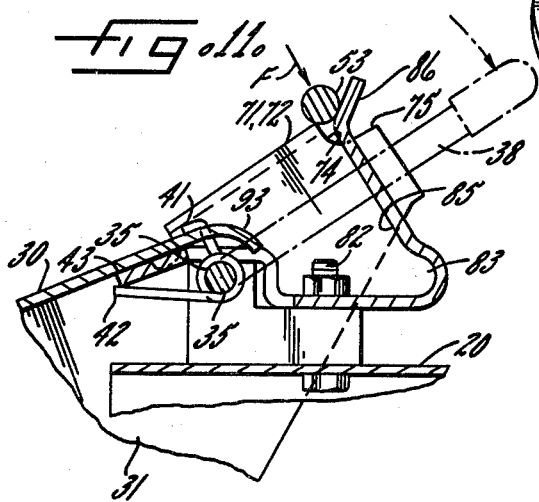
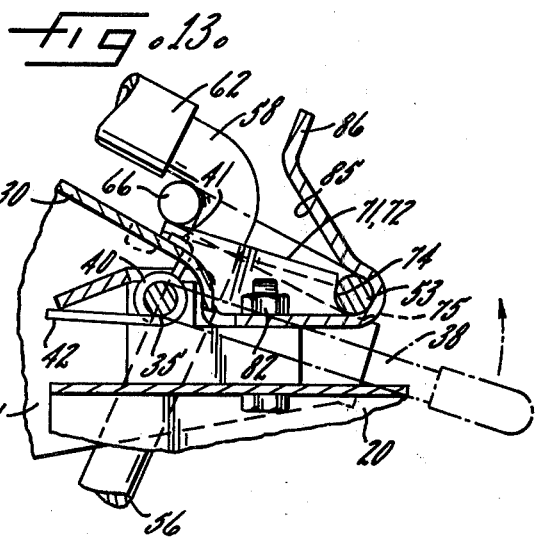
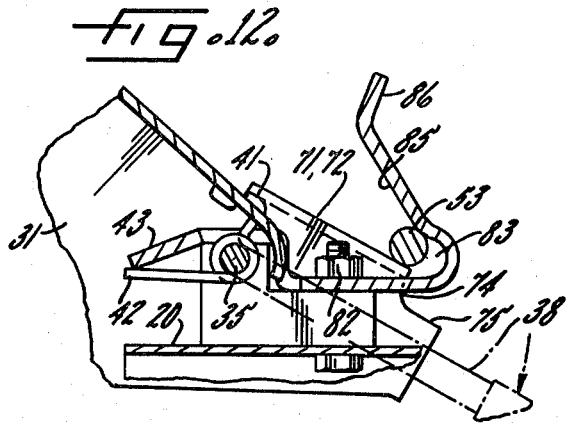

1

MOWER ASSEMBLY WITH CATCHER SECUREMENT

Rotary lawn mowers are commonly operated with or without catchers. When used without a catcher a downwardly angled guard must be interposed at the opening of the discharge chute to deflect downwardly stones or other missiles struck by the blade. However, when a catcher is attached to the mower it is desirable to have the guard upraised to a horizontal freely discharging position so that the clippings may pass without interference into the catcher.

It is an object of the present invention to provide a mechanism for coupling together a rotary lawn mower and catcher which is safe and positive in its action, insuring (a) that the guard is in angled position for interception of missiles when the mower is operated without a catcher and (b) that the guard is raised to a horizontal, free discharge position, and positively locked in such position, when the catcher is attached in receiving position.

It is another object to provide a mechanism for securing a catcher to a rotary lawn mower easily and quickly, employing natural movements and without requiring any skill or experience. Thus it is an object to provide a securing mechanism which permits the catcher to be simply "hung" on the mower chute with an inward and downward movement of the kind used in attaching many catchers of conventional design, but with the inward and downward movement serving, in addition, to bring about automatic upward tilting of the guard into free discharge position and locking of the catcher in place. Although the catcher is posivitely secured with no possibility of accidental detachment, intentional removal of the catcher, for emptying the catcher of clippings, is equally quick and easy.

It is still another object of the invention to provide a mower assembly with catcher securement in which the coupling mechanism is highly economical and easy to install and which requires only minor modification of existing parts and addition of only a single guiding and locking element to the mower. Moreover, only minor modification of the catcher frame is required, namely, the provision of a horizontal, slightly projecting supporting rod. Thus the invention can be readily adapted to a wide variety of existing designs of rotary mowers and cooperating catchers.

Other objects and advantages of the invention will become apparent upon reading the attached detailed description and upon reference to the drawings in which:

FIG. 4 is a vertical section taken with the guard in angled position looking along line 4—4 in FIG. 3.

FIG. 4a is a fragment taken along line 4a—4a in FIG. 3.

FIG. 5 is an exploded top view with the guard upraised.

FIG. 6 is a fragmentary vertical section with the guard upraised.

FIG. 7 is an end elevation of the guard and chute looking along line 7—7 in FIG. 6.

FIG. 8 is a fragmentary perspective showing the frame structure at the catcher throat.

FIG. 9 is an exploded view of the catcher frame.

FIG. 10 is a perspective view of a bag mountable on the frame.

FIG. 11, 12 and 13 are stop motion views showing the positions of the parts incident to hanging a catcher in place on the mower.

While the invention has been described in connection with a preferred embodiment, it will be understood that there is no intention to limit the invention to the particular embodiment shown but it is, on the contrary, intended to cover the various alternative and equivalent constructions included within the spirit and scope of the appended claims.

Figure 1:
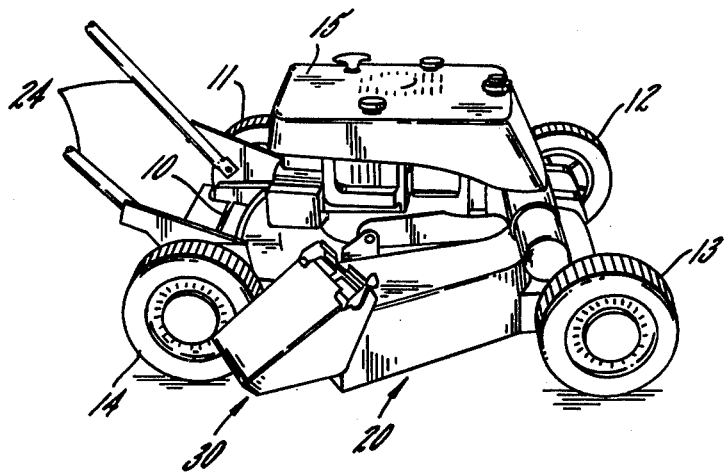
FIG. 1 is a perspective view of a mower embodying the present invention with no catcher attached.

Turning now to FIG. 1 there is shown a mower having a housing 10, wheels 11-14 and an engine 15 driving the usual rotating blade (not shown). The clippings are discharged through a tangential discharge chute 20 of inverted U cross section having side walls 21, 22 and a top wall 23 (see also FIG. 7). The mower is propelled and guided by means of a handle 24.

Superimposed upon the chute is a guard 30 which is also of inverted U shape having sides 31, 32 and a top wall 33. The guard is pivoted to the chute by means of a transversely extending pivot pin 35 which extends along a horizontal pivot axis 36 which is located at the top wall of the chute adjacent the discharge opening. The pin is, for the sake of convenience, nested in a groove 37 formed in spaced embossments mounted above the mouth of the chute. The pivot pin 35 is preferably bent into L shape to provide an operating arm 38 which extends inwardly and the purpose of which will become clear.

For the purpose of biasing the guard to a normal downwardly-angled position illustrated in FIGS. 1 and 4, a coil spring 40 encircles the pin 35 with the first end 41 of the spring engaging a registering opening in the guard and with the second end 42 being braced against the chute structure. The spring 40 applies torque to the guard urging it strongly into the downwardly angled position illustrated in FIG. 4 in which the guard bottoms on a stop surface 43 located in the path of movement.

Figure 2:
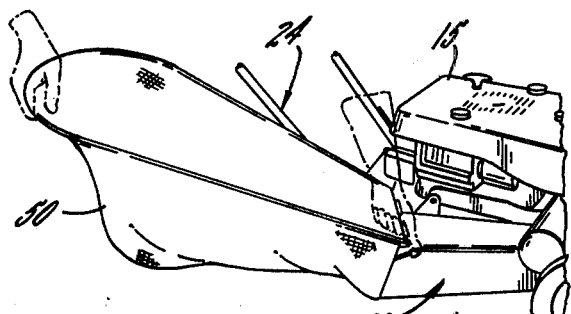
FIG. 2 is a perspective view of the mower shown in FIG. 1 with catcher attached.
Figure 3:
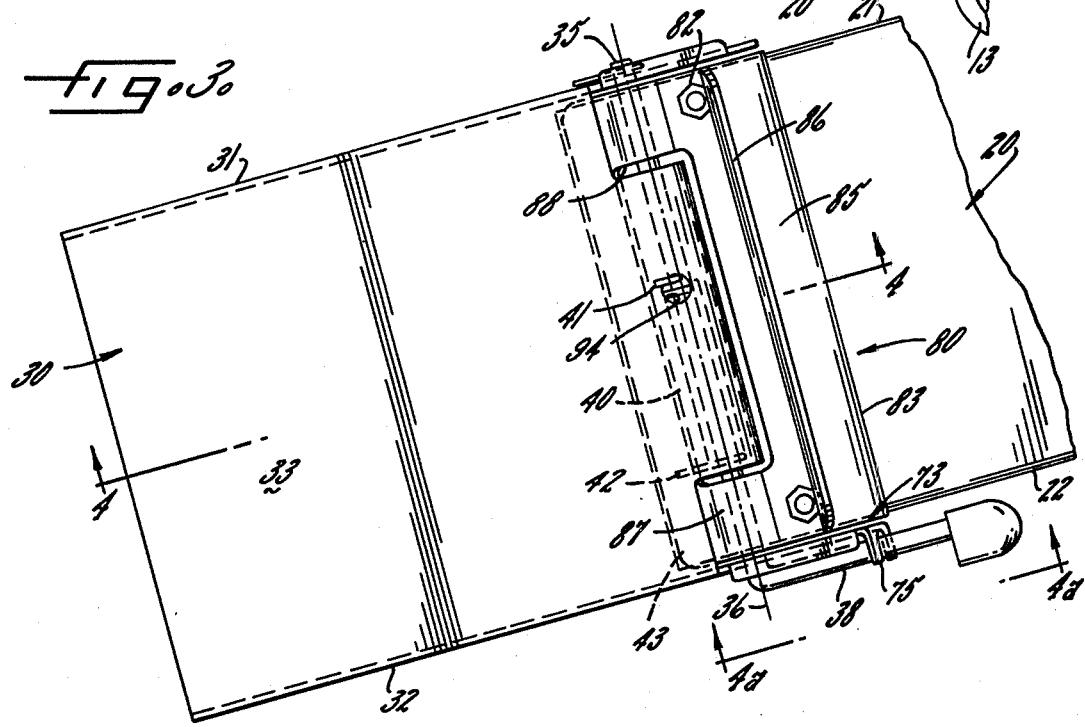
FIG. 3 is a top view of the guard shown in FIG. 4.

When it is desired to catch the clippings a catcher 50 is provided as illustrated in FIG. 2 and shown in greater detail in FIGS. 8, 9 and 10. The catcher 50 has a frame 51 and a bag 52. The frame 51 includes a throat of rectangular shape defined by an upper horizontal supporting rod 53 which overhangs the throat and a lower rod 54 having upwardly bent sides 55, 56 terminating in bent-over mounting tips 57, 58. The body of the bag is supported upon a hoop 60 formed of hollow tubing and having ends 61, 62 which telescopingly receive the tips 57, 58 previously mentioned. The upper rod 53 occupies a slightly offset, overhanging position, having bent end portions 63, 64 which are welded in place at the inner ends of the mounting tips.

In accordance with the present invention the sides of the guard include projections which extend inwardly of the pivot axis, the projections having upwardly facing notches formed at the inner ends thereof defining vertical obstructing edges, the notches cooperating with a horizontally facing groove on the top wall of the chute which is spaced inwardly and parallel to the pivot axis and which is so located as to be in register with the notches when the guard is tilted to a horizontal, freely discharging position. With the supporting rod 53 of the catcher in register with the groove and notches, the supporting rod is held captive in the groove and, by interference with the projections on the guard, serves to maintain the guard in its upraised position.

Thus referring to FIGS. 4, 4a and 5 the inward projections of the sides 31, 32 of the guard, which are indicated at 71, 72, are each formed with upwardly facing notches 73. Each notch has an interfering vertical edge 74 and a generally horizontal root 75. For defining the groove a rod retainer plate 80 is provided having a base 81 for mounting on the top of the chute, the base being secured to the chute by screws 82. The rod retainer is of hook shape, with the hook defining a horizontally facing groove 83 which is registrable with the notches 73.

In accordance with one of the aspects of the present invention the rod retainer has an integral upstanding guide member 84 presenting an angled guide surface 85 having a rearwardly bent lip 86. In addition the rod retainer has integral outwardly extending tabs 87 which overlie the pivot pin 35 and which serve to keep it seated in the groove 37, with the tabs being separated by a window 88 to provide clearance for the spring 40. Finally, the retainer integrally includes the stop surface 43, along the outer edge thereof, which blocks the downward movement of the guard under a combination of the force of gravity and the force applied by the spring.

For coupling the arm 38 at the end of the pivot pin 35 to the guard, the projection 72 at the right-hand side of the guard includes integral tabs 91, 92 which hold the arm 38 captive between them. Finally, and as will be noted in FIG. 5, the top of the guard has a central extension 93 which extends inwardly and which is curved protectively over the spring 40, with a hole formed therein to accept the end 41 of the spring.

In mounting the catcher on the mower, with the guard 30 occupying its normal downwardly angled position, the horizontal supporting rod 53 of the catcher is positioned against the angled guide surface 85 of the rod retainer and in a position to press downwardly against the inwardly extending projections 71, 72 of the guard. Conveniently, the frame of the catcher may be grasped with the right hand at the right-hand side of the throat while the outer end of the catcher frame is supported with the left hand. Force is applied inwardly and downwardly as indicted by the vector F in FIG. 11 causing the guard to be rocked clockwise. Only moderate manual force is required, particularly since the weight of the catcher is effective. The supporting rod 53 thus slides downwardly along the guide surface 85 accompanied by clockwise rotation of the guard about the pivot pin 35, with the guard rising slightly above horizontal position as illustrated in FIG. 12 until the supporting rod 53 snaps into the receiving groove 83. This releases the guard so that, under the force of bias, the guard returns immediately to its horizontal position as illustrated in FIG. 13. As the notches 73 move into register with the groove 83 the vertical obstructing edges 74 of the notches prevent the supporting rod from moving horizontally, that is, prevent the supporting rod from leaving the groove 83. At the same time the supporting rod is in the path of movement of the root edges 75 of the notches so that the guard is positively held in its upwardly tilted, generally horizontal position illustrated in FIG. 6 and in which there is a free and unobstructed flow of clippings from the chute into the receiving bag. If desired, the chute, during installation of the catcher, may be manually tilted to upraised position be pressing upon the arm 38 thereby reducing the amount of downward force F (FIG. 11) which need be applied. It is to be noted that the arm 38 may be conveniently manipulated by the thumb of the right hand of the user at the same time that the catcher frame is supported at the right hand side of the throat.

It is to be noted that the guide member 84 is so angled that the notches 73 are shielded, and cannot accept the rod, until the groove position is reached, so that no care need be exercised. In short, the catcher is simply hung in position by means of horizontal supporting rod 53. The vertical dimension D of the throat opening, as measured between the upper supporting rod 53 and the lower rod 54 is preferably such, as indicated in FIG. 6, that the lower rod rests against the outer edge of the chute, thereby holding the catcher in an outwardly extending, cantilevered position. Since the supporting rod 53 is positively locked in the groove of the retaining member, there is substantially no possibility that the catcher will become accidentally detached.

After the catcher is filled with clippings, the catcher is easily and quickly removed simply by reversing the process: That is to say, the catcher is gripped in the same way with the right hand of the operator at the right hand of the catcher throat, and pressure is applied to the guard operating arm 38 which is accessible to the operator's thumb thereby moving the guard from the horizontal position shown in FIG. 13 slightly upwardly to the position shown in FIG. 12 which moves the obstructing edge 74 of the notches downwardly clear of the groove 83, permitting the catcher supporting rod 53 to be withdrawn. With the supporting rod removed, the guard is free, under the force of gravity and spring bias, to restore itself to its normal downwardly angled position illustrated in FIGS. 4 and 11. The assembly is thus safe for operation either with or without the catcher.

The objects of the invention have been fully carried out since the mechanism is not only safe and positive but easily manipulated, employing natural movements for both attaching and removal and with the forces being sufficiently light to permit safe and easy operation by a person of limited strength without necessity for exercise of skill or judgment. The coupling mechanism is inherently economical. The catcher itself is of a simple construction requiring no more than the usual number of elements employed in a conventional catcher frame and with the only added element on the mower being in the form of the rod retainer plate which is readily attached to a conventional mower chute and which provides both the groove 83 and guide surface 85, in addition to serving as a pivot hold-down and limit stop. The terms "notch" and "groove" have been used for convenience in referring to recesses which face upwardly and horizontally, respectively, without any implication as to relative axial length. That is to say, the axial length of the groove may be substantially reduced and the axial length of the notches may be substantially increased without departing from the invention. The two terms are thus interchangeable. Indeed, while the use of two notches, one at each side of the guard, is preferred, it will be apparent to one skilled in the art that the invention may be practiced in a simplified form utilizing only one of the projections and its associated notch. Moreover, it is not essential to the practice of the invention that a notch be formed on a projection which is integral with the side wall of the guard.

The pin 35 which defines the pivot axis is preferably located at the top edge of the chute adjacent the discharge opening but he actual axis position may depart slightly from that shown without affecting the operation. While the arm 38 is preferably formed as part of the pivot pin 35, it will be understood that this is a matter of convenience and that the guard may be tilted by any manually accessible arm or projection which is spaced inwardly of the tilt axis. Finally, it will be understood that the term "horizontal" as applied to the position of the guard 30, and which has been illustrated in FIGS. 6 and 13, refers to the nominal free discharge position in which the guard is locked during use of the catcher, even though such locked position may depart somewhat from true horizontal in one direction or the other; indeed, the illustrated upward angling is preferred.

What is claimed is:

1. A mower assembly with catcher securement comprising, in combination, a rotary mower structure including a housing having a discharge chute of inverted U cross section formed of side walls and a top wall and defining an opening for outward discharge of a stream of clippings, a guard of inverted U cross section having sides and a top wall superimposed on the discharge chute and extending beyond it, means for pivoting the guard to the discharge chute along an axis located at the top wall of the chute adjacent the discharge opening, means for biasing the guard downwardly about its pivot axis, a stop in the path of downward movement of the guard for defining a normal downwardly-angled guarding position for interception of missiles in the stream, the sides of the guard including projections extending inwardly of the pivot axis and having upwardly facing notches at the inner ends thereof defining vertical obstructing edges, means on the top wall of the chute defining a horizontally facing groove spaced inwardly of the pivot axis and parallel thereto and so located as to be in register with the notches when the guard is tilted to a horizontal freely discharging position, a catcher having a frame and a bag supported thereby, the frame defining a throat registering with the end of the chute and enclosing the guard, the frame including a horizontal supporting rod at the upper edge of the throat, an upstanding guide member mounted on the discharge chute adjacent the groove and so angled that when the horizontal supporting rod of the catcher is positioned against the guide member and pressed downwardly against the projections on the guard, the guard is swung upwardly to a position slightly beyond the horizontal position for entry of the supporting rod into the groove followed by slight downward movement of the guard under the force of bias into horizontal position in which the obstructing edges of the notches hold the rod captive in the groove.

2. The combination as claimed in claim 1 in which the guard has an arm projecting inwardly from the pivot axis and into readily accessible position for subsequently tipping the guard upwardly beyond its horizontal position to move the obstructing edges of the notches out of obstructing position to free the rod for movement out of the groove for removal of the catcher from the mower housing.

3. A mower assembly with catcher securement for use with a catcher having a frame in a bag supported thereby, the frame defining a throat including a horizontal supporting rod at the upper edge of the throat, comprising, in combination, a rotary mower structure including a housing having a discharge chute of inverted U cross section formed of side walls and a top wall and defining an opening for outward discharge of a stream of clippings, a guard of inverted U cross section having sides and a top wall superimposed on the discharge chute and extending beyond it, means for pivoting the guard on the discharge chute along an axis located at the top wall of the chute adjacent the discharge opening, means for biasing the guard downwardly about its pivot axis, a stop in the path of downward movement of the guard for defining a normal downwardly-angled guarding position for interception of missiles in the stream, the sides of the guard being extended inwardly of the pivot axis to form symmetrical projections, means on the top wall of the chute defining a horizontally facing groove spaced inwardly of the pivot axis and parallel thereto, the inner ends of the projections being formed with respective upwardly facing notches each having a vertical obstructing edge, the groove being so located as to register with the notches when the guard is tilted to a horizontal freely discharging position, means defining an upstanding guide surface extending along and above the groove and so arranged that when the horizontal supporting rod of a catcher is positioned against the guide surface and pressed downwardly against the projections on the guard, the guard is swung upwardly to a position slightly beyond the horizontal position for entry of the rod into the groove followed by slight downward movement of the guard into horizontal position under the force of bias so that the obstructing edges of the notches hold the rod captive in the groove.

4. The combination as claimed in claim 3 in which the groove and guide surface are integrally included in a rod retainer plate having a flat mounting portion secured to the chute and which is bent into hook shape to form the groove, with an upstanding edge adjacent the hook forming the guide surface.

5. A mower assembly with catcher securement for use with a catcher having a frame and a bag supported thereby, the frame defining a throat including a horizontal supporting rod at the upper edge of the throat, comprising, in combination, a rotary mower structure including a housing having a discharge chute of inverted U cross section formed of side walls and a top wall and defining an opening for outward discharge of a stream of clippings, a guard of inverted U cross section having sides and a top wall superimposed on the discharge chute and extending beyond it, means for pivoting the guard to the discharge chute along an axis located at the top wall of the chute adjacent the discharge opening, means for biasing the guard downwardly about its pivot axis, a stop in the path of downward movement of the guard for defining a normal downwardly-angled guarding position for interception of missiles in the stream, the guard having an integral projection which extends inwardly of the pivot axis, means on the top wall of the chute defining a horizontally facing groove spaced inwardly of the pivot axis and parallel thereto, the projection being formed with an upwardly facing notch having a vertically extending obstructing edge, the groove being so located as to register with the notch when the guard is tilted to a horizontal freely discharging position, an upstanding guide member extending along the groove so arranged that when the horizontal supporting rod of a catcher is positioned against the guide member and pressed downwardly against the projections on the guard, the guard is swung upwardly to a position slightly beyond the horizontal position for entry of the rod into the groove followed by slight downward movement of the guard into horizontal position under the force of bias so that the obstructing edge of the notch holds the rod captive in the groove, the guard having an arm which extends inwardly from the pivot axis for subsequently tipping the guard upwardly slightly beyond its horizontal position to move the obstructing edge of the notch out of obstructing position to free the rod from the groove for removal of the catcher from the mower housing.

6. A mower assembly with catcher securement for use with a catcher having a frame and a bag supported thereby, the frame defining a throat including a horizontal supporting rod at the upper edge of the throat, comprising, in combination, a rotary mower structure including a housing having a discharge chute of inverted U cross section formed of side walls and a top wall and defining an opening for outward discharge of a stream of clippings, a guard of inverted U cross section having sides and a top wall superimposed on the discharge chute and extending beyond it, means for pivoting the guard on the discharge chute along an axis located at the top wall of the chute adjacent the discharge opening, means for biasing the guard downwardly about its pivot axis, a stop in the path of downward movement of the guard for defining a normal downwardly-angled guarding position for interception of missiles in the stream, the sides of the guard being extended inwardly of the pivot axis to form symmetrical projections, means on the top wall of the chute defining an outwardly facing groove spaced inwardly of the pivot axis and parallel thereto, the inner ends of the projections being formed with respective upwardly facing notches each having a vertical obstructing edge, the groove being so located as to register with the notches when the guard is tilted to a horizontal freely discharging position, means defining an upstanding outwardly facing guide surface extending along and above the groove and so arranged that when the horizontal supporting rod of a catcher is positioned against the guide surface and pressed downwardly against the projections on the guard, the guard is swung upwardly to a position slightly beyond the horizontal position for guidance of the rod into the groove followed by slight downward movement of the guard into horizontal position under the force of bias so that the obstructing edge of the notch holds the rod captive in the groove.

7. A mower assembly with catcher securement for use with a catcher having a frame and a bag supported thereby, the frame defining a throat including a horizontal supporting rod at the upper edge of the throat, comprising, in combination, a rotary mower structure including a housing having a discharge chute of inverted U cross section formed of side walls and a top wall and defining an opening for outward discharge of a stream of clippings, a guard of inverted U cross section having sides and a top wall superimposed on the discharge chute and extending beyond it, means for pivoting the guard on the discharge chute along an axis located at the top wall of the chute adjacent the discharge opening, means for biasing the guard downwardly about its pivot axis, a stop in the path of downward movement of the guard for defining a normal downwardly-angled guarding position for interception of missiles in the stream, the sides of the guard being extended inwardly of the pivot axis to form symmetrical projections, a rod retainer member on the top wall of the chute defining an outwardly facing groove spaced inwardly of the pivot axis and parallel thereto, the inner ends of the projections being formed with respective upwardly facing notches each having a vertical obstructing edge, the groove being so located as to register with the notches when the guard is tilted to a horizontal freely discharging position, guard operator means coupled to the guard and operated incident to installation of a catcher on the mower for swinging the guard upwardly to a position slightly beyond the horizontal position for entry of the rod into the groove followed by slight downward movement of the guard into horizontal position under the force of bias so that the obstructing edge of the notch holds the rod captive in the groove, the guard operator means being accessible for manual manipulation with the catcher in position so that upon subsequent operation thereof the guard is tipped upwardly slightly beyond its horizontal position to move the obstructing edges of the notches out of obstructing position to free the rod from the groove for removal of the catcher from the mower housing.

8. A mower assembly with catcher securement comprising, in combination, a rotary mower structure including a housing having a discharge chute of inverted U cross section formed of side walls and a top wall and defining an opening for outward discharge of a stream of clippings, a guard of inverted U cross section having sides and a top wall superimposed on the discharge chute and extending beyond it, means for pivoting the guard on the discharge chute along an axis located at the top wall of the chute adjacent the discharge opening, means for biasing the guard downwardly about its pivot axis, a stop in the path of downward movement of the guard for defining a normal downwardly-angled guarding position for interception of missiles in the stream, the guard having a portion which extends inwardly of the pivot axis, means on the top wall of the chute defining a horizontally facing groove spaced inwardly of the pivot axis and parallel thereto, means on the inwardly extending portion of the guard defining an upwardly facing notch having a vertical obstructing edge, the groove being so located as to register with the notch when the guard is tilted to a horizontal freely discharging position, a catcher having a frame and a bag supported thereby, the frame defining a throat registering with the end of the chute and enclosing the guard, the frame including a horizontal supporting rod at the upper edge of the throat, the horizontal supporting rod being held captive in the horizontal groove by the edge of the notch when the catcher is in place on the mower housing for holding the guard upraised in horizontal position for free discharge of clippings into the bag, and means for tipping the guard upwardly beyond its horizontal position to move the edge of the notch out of obstructing position to free the rod for removal of the catcher from the mower housing.

9. A mower assembly with catcher securement comprising, in combination, a rotary mower structure including a housing having a discharge chute of inverted U cross section formed of side walls and a top wall and defining an opening for outward discharge of a stream of clippings, a guard of inverted U cross section having sides and a top wall superimposed on the discharge chute and extending beyond it, means for pivoting the guard to the discharge chute along an axis located at the top wall of the chute adjacent the discharge opening, means for biasing the guard downwardly about its pivot axis, a stop in the path of downward movement of the guard for defining a normal downwardly-angled guarding position for interception of missiles in the stream, the guard having a portion which extends inwardly of the pivot axis, a rod retainer plate secured to the top wall of the chute and of hook-shaped cross section defining a horizontally facing groove spaced inwardly of the pivot axis, means on the inwardly extending portion of the guard defining an upwardly facing notch having a vertical obstructing edge, the notch and groove being so located that they are in register when the guard is tilted to a horizontal freely discharging position, a catcher having a frame and a bag supported thereby, the frame defining a throat registering with the end of the chute and enclosing the guard, the frame including a horizontal supporting rod, the horizontal supporting rod being captive in the registering groove and notch when the catcher is in place on the mower housing for holding the guard in its horizontal position for free discharge of clippings into the bag, the rod retainer plate being bent upwardly adjacent the groove to provide a guide surface for guiding the rod into a seated position in the groove, and means including an arm coupled to the guard for tipping the guard upwardly beyond its horizontal position to move the obstructing edge of the notch out of register with the groove to free the rod for removal of the catcher from the mower housing.

10. The combination as claimed in claim 9 in which the stop in the path of downward movement of the guard is located at the outer edge of the rod retainer plate.

11. A mower assembly with catcher securement comprising, in combination, a rotary mower structure including a housing having a discharge chute of inverted U cross section formed of side walls and a top wall and defining an opening for outward discharge of a stream of clippings, a guard of inverted U cross section having sides and a top wall superimposed on the discharge chute and extending beyond it, a transversely extending pivot pin for pivoting the guard to the discharge chute along an axis located at the top wall of the chute adjacent the discharge opening, means for biasing the guard downwardly about its pivot axis, a stop in the path of downward movement of the guard for defining a normal downwardly-angled guarding position for interception of missiles in the stream, the sides of the guard having projections which extend inwardly of the pivot axis beyond the top wall of the guard, the projections being formed with upwardly facing notches having vertical obstructing edges respectively adjacent the ends of the projections, a rod retainer plate secured to the top wall of the chute and of hook-shaped cross section defining an outwardly facing groove spaced inwardly of the pivot axis, the groove being so located that it is in register with the notches when the guard is tilted to a horizontal freely discharging position, a catcher having a frame and a bag supported thereby, the frame defining a throat of rectangular profile having an upper horizontal rod and a lower horizontal rod, the upper horizontal rod being captive in the registering groove and notches when the catcher is in position on the mower housing for holding the guard in its horizontal position for free discharge of clippings into the bag, the lower horizontal rod being spaced from the upper rod for abutting engagement with the side walls of the chute adjacent the lower ends thereof for supporting the catcher in an outwardly cantilevered position, and an inwardly extending arm on the guard manually operable when the bag is full of clippings for tipping the guard slightly upwardly beyond its horizontal position to move the obstructing edges of the notches out of register with the groove thereby to free the upper rod for movement outwardly of the groove for removal of the catcher from the mower housing.

* * * * *